United States Patent [19]

Hager

[11] Patent Number: 4,923,346

[45] Date of Patent: May 8, 1990

[54] SYSTEM FOR ANCHORING A MOBILE EQUIPMENT CARRIER ON A PLATFORM

[75] Inventor: Clarence H. Hager, Rockford, Ill.

[73] Assignee: James C. Hager, Executor of Estate of Clarence H. Hager, Rockford, Ill.

[21] Appl. No.: 267,802

[22] Filed: Nov. 7, 1983

[51] Int. Cl.[5] .............................................. B60P 3/06
[52] U.S. Cl. ......................................... 410/19; 16/44
[58] Field of Search ..................... 105/159; 410/9, 10, 410/19, 20, 67; 188/1.12, 4 R, 32, 28; 16/29, 44, 45

[56] References Cited

U.S. PATENT DOCUMENTS

| 1,101,883 | 6/1914 | Rockford | 188/32 |
|---|---|---|---|
| 1,733,269 | 10/1929 | Mauk et al. | 188/32 |
| 2,738,542 | 3/1956 | Clark, Jr. | |
| 3,066,950 | 12/1962 | Olson et al. | |
| 3,518,714 | 7/1970 | Hager | |
| 4,354,604 | 10/1982 | Isaacs | 188/32 |
| 4,437,597 | 3/1984 | Doyle | 211/23 X |
| 4,659,266 | 4/1987 | Thelen et al. | 410/87 X |
| 4,685,174 | 8/1987 | Hager | 16/44 |

Primary Examiner—Andres Kashnikow
Assistant Examiner—Kevin P. Weldon
Attorney, Agent, or Firm—Vernon J. Pillote

[57] ABSTRACT

A system for anchoring a mobile equipment carrier on a platform for transport by a freight carrier wherein the mobile equipment carrier is supported on a plurality of shock absorbing casters. Wheel anchors including a base bracket and a hold-down bracket attach the wheel of each caster to the platform to retain the caster against rolling and swiveling about the caster axis while accommodating vertical movement of the shock absorbing casters and the equipment supported thereby. The base bracket comprises a sheet metal member having end portions and an upwardly facing saddle shaped intermediate portion integral with the end portions and adapted to receive a caster wheel. The hold-down bracket comprises a sheet metal member having a mounting portion adapted for attachment to one end of the base bracket and a wheel engaging portion that extends upwardly from the mounting portion and is curved to extend around an upper portion of the outer periphery of a caster wheel to retain the wheel in the saddle shaped intermediate portion of the base bracket. The base bracket has laterally spaced ribs in the saddle shaped intermediate portion adapted to engage opposite sides of the caster wheel adjacent the outer periphery thereof, and a fastener to secure the mounting portion of the hold-down bracket to one end portion of the base bracket and to the platform.

8 Claims, 1 Drawing Sheet

U.S. Patent
May 8, 1990
4,923,346
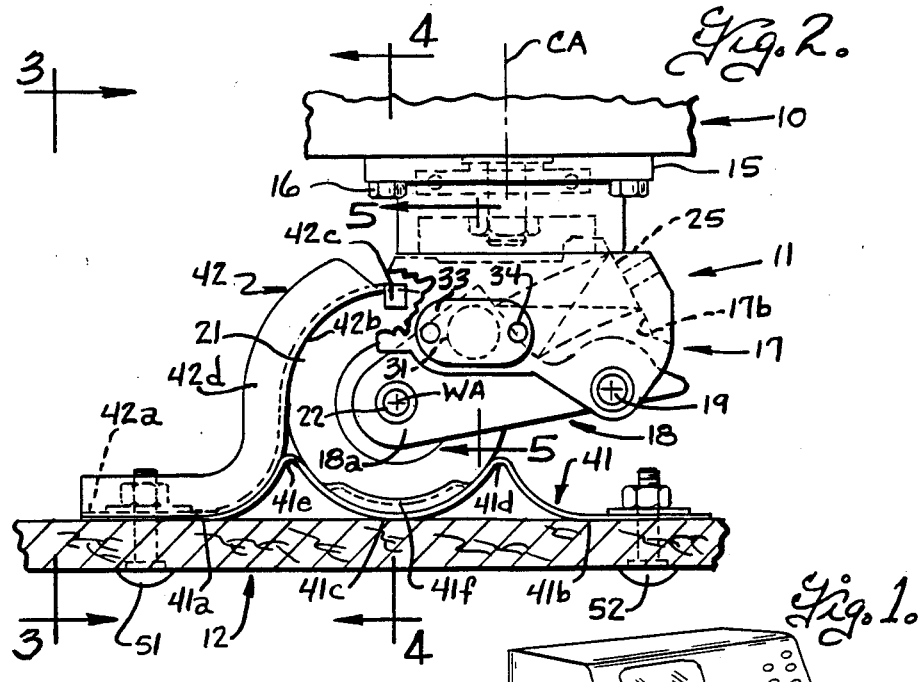
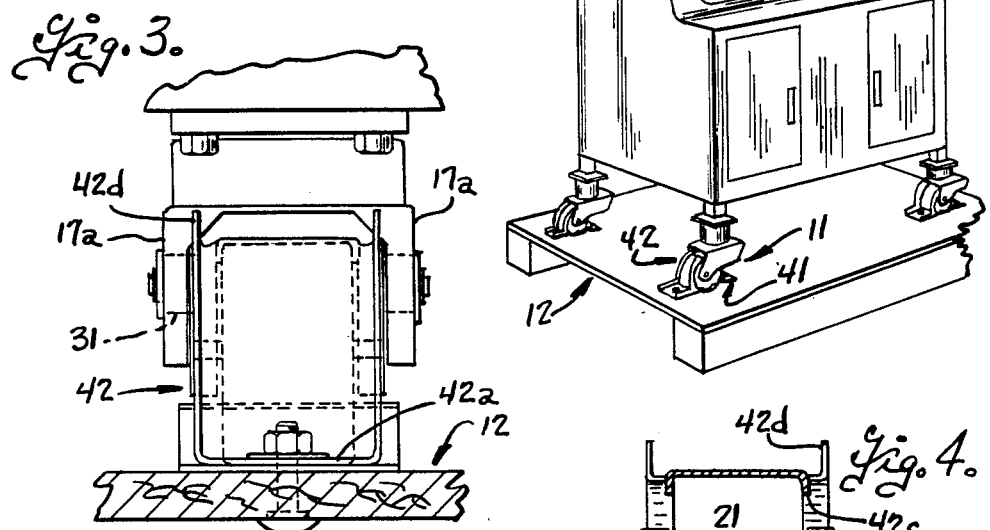
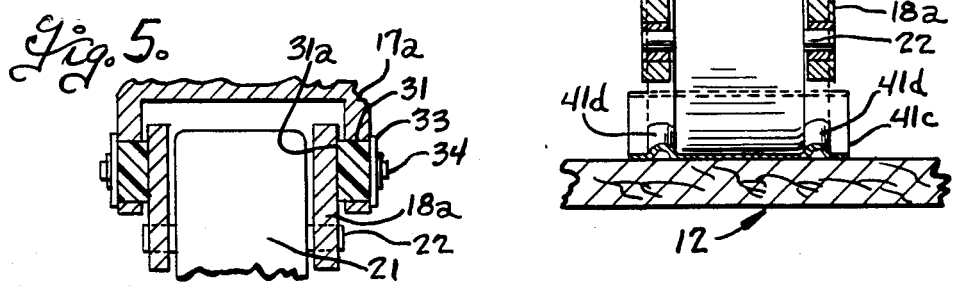

SYSTEM FOR ANCHORING A MOBILE EQUIPMENT CARRIER ON A PLATFORM

BACKGROUND OF THE INVENTION

Caster wheels are commonly used on mobile equipment carriers to facilitate movement of the equipment from place to place. The wheels on such caster wheel suspensions are subjected to relatively high impact forces when they engage an obstruction, which impact forces increase as a function of increasing speed and weight or load, and decreasing wheel radius. Shock absorbing caster wheel suspensions such as disclosed in U.S. Pat. Nos. 2,738,542 and 3,518,714 have heretofore been provided to reduce transmission of impact forces from the ground engaging wheels to the mobile equipment supported on the equipment carrier.

Mobile equipment carriers are sometimes transported on freight carriers such as trucks, airplanes and the like with the carriers supported by the shock absorbing wheel suspensions. The shock absorbing wheel suspensions function to absorb shock loads transmitted by the freight carrier to the wheel of a shock absorbing wheel suspensions and dynamic or "G" loads transmitted by the load or equipment to the shock absorbing wheel suspensions. However, when shock absorbing wheel suspensions are used to support the load on a freight carrier, it has been found that the equipment carrier sometimes goes into heavy vibration which can be damaging to some types of goods and equipment. Thus, while shock absorbing wheel suspensions are adapted to absorb and reduce transmission to the equipment of relatively high impact shocks of a random nature, a periodic disturbing force from the freight carrier, even of low amplitude, can produce very large forced vibration in the equipment supported on the shock absorbing wheel suspension when the frequency of the disturbing force approaches the frequency of natural vibration of the shock absorbing wheel suspension and the goods or equipment supported thereby.

The applicant's prior U.S. Pat. No. 4,685,174 discloses a shock absorbing caster suspension for a mobile equipment carrier wherein each shock absorbing caster includes a caster bracket mounted on the equipment carrier for swiveling movement about an upright caster axis, a wheel support bracket mounted on the caster bracket for swinging movement about a horizontal pivot axis, a caster wheel mounted on the wheel support bracket for rotation about a horizontal wheel axis parallel to the pivot axis, and a vibration dampening means acting between the wheel support bracket and the caster bracket for dampening brake oscillating of the wheel support bracket relative to the caster bracket. When transporting mobile equipment on freight carriers, it is of course necessary to anchor the mobile equipment against horizontal movement relative to the freight carrier. However, in order to achieve the benefits of shock absorption and vibration dampening provided by the above-described shock absorbing wheel suspension, the anchor must accommodate vertical movement of the mobile equipment carrier while inhibiting horizontal movement. One anchor system utilizes flexible straps attached to the mobile equipment and anchored to bulkheads on the freight carrier in a manner to resist horizontal movement of the mobile carrier while accommodating limited vertical movement. Such an anchoring system is quite cumbersome since it requires a plurality of straps to effectively anchor the mobile equipment against horizontal movement in all directions. It has also been proposed for example as disclosed in U.S. Pat. No. 3,066,950 to extend the caster wheel axles and anchor the axles to a platform such as the bed of a truck. Extension of the wheel axles not only requires modification of the construction of the caster wheel suspensions, but can also limit swinging movement of the wheel support bracket relative to the caster bracket and thus adversely affect the shock absorbing characteristics of the caster wheel suspension.

SUMMARY OF THE INVENTION

It is an object of the present invention to provide a system for anchoring a mobile equipment carrier on a platform for transport by a freight carrier wherein the mobile equipment carrier is supported on a plurality of shock absorbing casters, and which anchoring system is arranged to engage a wheel of each caster in a manner to inhibit rolling of the caster wheel, lateral movement of the caster wheel, and swiveling of the caster about the upright caster axis, without interfering with relative swinging movement between the wheel support bracket and the caster bracket of the casters.

Accordingly, the present invention provides a system for anchoring a mobile equipment carrier on a platform for transport by a freight carrier wherein the mobile equipment carrier is supported on a plurality of shock absorbing casters, each shock absorbing caster including a bracket mounted on the mobile equipment carrier for swiveling movement relative thereto about a generally upright caster axis, a wheel support bracket mounted on the caster bracket for swinging movement about a generally horizontal pivot axis, a caster wheel mounted on each wheel support bracket for rotation about a horizontal wheel axis parallel to the pivot axis, and vibration dampening means acting between the wheel support bracket and the caster bracket for dampening vertical oscillation of the wheel support bracket relative to the caster bracket. Wheel anchor means including a base bracket and a hold-down bracket are provided for attaching each caster wheel to a platform to retain the caster wheel against horizontal movement while accommodating relative vertical swinging movement between the wheel support bracket and the caster bracket. The base bracket has end portions and a wheel receiving portion intermediate the end portions adapted to underlie the caster wheel below the wheel axis. The wheel receiving portion defines a ramp adapted to engage the periphery of the caster wheel and the hold-down bracket has a mounting portion adapted for attachment to one end portion of the base bracket and a wheel engaging portion extending upwardly from the mounting portion and adapted to extend along a portion of the caster wheel to hold the caster wheel down on the wheel receiving portion of the base bracket. The hold-down bracket is detachably secured to one end portion of the base bracket and to the platform, and at least one of the items comprising the base bracket and hold down bracket have abutment means engageable with opposite sides of the caster wheel adjacent its outer periphery for inhibiting lateral movement of the caster wheel and swiveling movement of the caster wheel about the caster axis.

BRIEF DESCRIPTION OF THE DRAWINGS

FIG. 1 is a perspective view illustrating a mobile equipment carrier mounted on a platform;

FIG. 2 is a fragmentary side view illustrating one caster of the mobile equipment carrier anchored to a platform;

FIG. 3 is a fragmentary sectional view taken on the plane 3—3 of FIG. 2;

FIG. 4 is a fragmentary sectional view taken on the plane 4—4 of FIG. 2; and

FIG. 5 is a fragmentary sectional view taken on the plane 5—5 of FIG. 2.

DETAILED DESCRIPTION

The present invention relates to a system for anchoring a mobile equipment carrier 10 having a plurality of shock absorbing casters 11 on a platform 12 for transport by a freight carrier. The mobile equipment carrier can be used in conjunction with various different types of equipment that is subject to damage by shock and/or vibration during transport on a freight carrier and may, for example, be used to transport electronic equipment such as computers, copy machines, communication equipment and medical equipment. The mobile equipment carrier may be in the form of a truck or dolly having the equipment mounted thereon or attached thereto, or the equipment may be built into and form a part of the mobile equipment carrier. The platform 12 may be a pallet as shown in FIG. 1, or the base of a shipping crate or, alternatively, the platform can comprise the bed or deck of a freight carrier such as a truck or airplane.

The mobile equipment carrier is supported on a plurality of shock absorbing caster wheel suspensions 11 usually four in number adjacent the corners of the mobile equipment as shown in FIG. 1. The shock absorbing caster wheel suspensions are generally of the type disclosed in the applicant's prior U.S. Pat. No. 4,685,174, the disclosure of which is incorporated herein by reference. The caster wheel suspensions include a mounting bracket 15 attached to the mobile equipment carrier 10 as by fasteners 16; a caster bracket 17 mounted on the mounting bracket 15 for swiveling movement relative thereto about an upright caster axis CA; a wheel support bracket 18 mounted on the caster bracket by a pivot 19 for swinging movement about a generally horizontal pivot axis PA, and a caster wheel 21 mounted by an axle 22 on the wheel support bracket for rotation about a generally horizontal wheel axis WA that is parallel to and spaced horizontally from the caster axis CA. The caster bracket 17 has spaced side walls 17a and a transverse wall 17b that extends between and rigidly interconnects the side walls. The wheel support bracket 18 has spaced side walls 18a and a transverse wall 18b that extends between and rigidly interconnects the side walls 18a. The wheel support bracket 18 is disposed between the side walls 17a of the caster bracket 17 and the wheel 21 is disposed between the side walls 18a of the wheel support bracket and is supported by the axle 22 on the side walls 18a at a location horizontally offset from the caster axis CA at the side opposite axis PA. Thus, as the mobile equipment is moved over a surface, the casters are adapted to swivel about the caster axis CA so that the wheel 21 trails during movement over the surface. One or more coil type compression springs 25 (FIG. 2) are interposed between the transverse walls 17b and 18b of the caster bracket and wheel support brackets, respectively. Each compression spring is normally in the form of a straight cylinder having flat ends perpendicular to the axis of the cylinder, and the spring abutments formed by the transverse walls 17b and 18b are preferably arranged so they form an acute angle therebetween that progressively decreases as the wheel support bracket pivots about the pivot axis PA in a direction opposite the spring direction. With this arrangement, the normally straight compression springs having parallel end faces when undistended, becomes longitudinally arched as shown in FIG. 1 when disposed between the transverse walls 17b and 18b with its end faces seated against the same. A coil type compression spring when compressed in a direction along its axis has a uniform spring rate. However, when a normally straight compression spring is disposed between abutment faces that are initially disposed at an acute angle to each other and which move toward a parallel position, the spring exhibits a variable spring rate which is initially lower than the spring rate of the straight spring and which progressively increases and becomes equal to the rate of the straight spring when the abutment faces move into parallelism. The spring 25 is preferably selected so the caster apparatus operates in the curved or variable spring rate portion of the spring load deflection curve, when supporting its rated load.

The shock absorbing caster wheel as above described is adapted to absorb random or non-periodic impact forces on the wheel, even a relatively high amplitude, such as occur when the wheel engages an obstruction or drops off a small ledge during movement of the equipment over a surface. However, when the shock absorbing wheel suspension is utilized to support goods or equipment during transport on a freight vehicle such as a trailer or an airplane, the ground engaging wheels resting directly or indirectly on the bed of the freight vehicle, are subjected not only to random or non-periodic impact forces, but also to periodic or repetitive forces and, when the frequency of the disturbing force approaches the frequency of natural vibration of the shock absorbing wheel suspension and the load or equipment carried thereby, even relatively small disturbing forces can produce very large forced vibration of the shock absorbing wheel suspension and equipment. As disclosed in the aforementioned U.S. Pat. No. 4,685,184, vibration dampening means are provided to control vertical oscillation of the wheel support bracket relative to the caster bracket to inhibit resonant vibration of the shock absorbing caster wheel and the load or equipment carried thereby. The vibration dampening means comprises one or more vibration dampening pads 31 that are mounted on one of the items comprising the caster bracket and wheel support bracket and which have pad faces 31a disposed in planes perpendicular to the pivot axis PA and which engage wall surfaces on the side walls of the other of the items. In the embodiment illustrated, the vibration dampening pads 31 are mounted on the side walls 17a of the caster bracket and the pad faces 31a engage the outer faces of the side walls 18a of the wheel support bracket. The pads are pressed in a direction perpendicular to the pad faces into engagement with the outer face of the side walls 18a to have pressurized engagement therewith and to inhibit movement of the wheel support bracket relative to the caster bracket. The pads are advantageously formed of a resilient elastomeric material and a clamp plate 33 overlies the outer end of each pad and is secured to the caster bracket as by fasteners 34. The thickness of the pads is selected such that, when the clamp plates 33 are secured to the caster bracket, the pads are axially compressed into pressurized engagement with the outer face of the side walls of the wheel support bracket.

In accordance with the present invention, wheel anchor means including a base bracket 41 and a hold-down bracket 42 are provided for attaching each caster wheel to a platform to retain the caster wheel against rolling about the wheel axis and swiveling about the caster axis, while accommodating relative vertical swinging movement between the wheel support bracket and the caster bracket about the horizontal pivot axis. The base bracket 41 has spaced end portions 41a and 41b and a wheel receiving portion 41c intermediate the end portions and adapted to underlie the caster wheel 21 below the wheel axis. The intermediate wheel receiving portion is arranged to inhibit rolling movement of the wheel and is preferably in the form of an upwardly opening saddle that generally conforms to the curvature of the lower portion of the caster wheel 21. The base bracket is preferably formed of sheet metal shaped so that the underside of the saddle 41c extends tangent to a plane through the underside of the end portions 41a and 41b, to rest on the platform 12, and to provide ramps or wheel chocks 41d and 41e that project above the plane through the end portions for engagement with the lower portion of the periphery of the wheel at opposite sides of a vertical plane through the wheel axis. Laterally spaced ribs 41f are formed on the intermediate portion and spaced apart a distance to engage opposite sides of the caster wheel 21 adjacent its outer periphery, to inhibit lateral movement of the caster wheel relative to the base bracket.

The hold-down bracket 42 has a mounting portion 42a at one end adapted for attachment to one end portion of the base bracket and a wheel engaging portion 42b that curves upwardly to extend along the outer face of one of the ramps 41e and then curves around an upper portion of the periphery of the caster wheel opposite the portion of the caster wheel periphery engaged by the ramp 41d. The wheel engaging portion of the hold down clamp extends around the upper periphery of the caster wheel 21 to a location substantially above the caster wheel axis WA to hold the caster wheel down on the wheel receiving portion of the base bracket. The hold-down bracket has downwardly extending ears 42c on its upper end spaced apart a distance approximating the width of the caster wheel to engage opposite sides of the caster wheel adjacent its outer periphery. As will be seen, the ribs 41f on the base bracket and the depending ears 42c on the hold-down bracket inhibit lateral movement of the caster wheel and thereby inhibit swiveling of the caster about the upright caster axis CA. The hold-down bracket 42 is preferably formed of sheet metal and provided with rigidifying and stiffening flanges 42d along opposite side edges.

The hold down bracket 42 is fastened to one end portion of the base bracket and to the platform 12 by a bolt and nut type fastener 51 and the other end portion of the base bracket is secured to the platform by a nut and bolt type fastener 52. The end portions of the base bracket are formed with openings for receiving the bolts 51 and 52 and the hold down bracket is similarly formed with an opening in the lower end portion for receiving the bolt 51. When mounting the mobile equipment carrier on the platform, all casters on the mobile carrier are positioned to face in the same direction and the location of the mounting holes for the base bracket are then marked and drilled to receive the fasteners 51 and 52 for the several caster wheel suspensions. The base bracket and hold-down bracket hold each caster wheel firmly on the platform in a manner which prevents rolling of the caster wheel about the wheel axis and lateral movement of the caster wheel relative to the base bracket and swiveling of the caster about the upright caster axis CA, while accommodating relative vertical swinging movement between the wheel support bracket and caster bracket about the horizontal pivot axis PA. Thus, when the caster wheels are anchored to the platform by the base and hold-down brackets, the shock absorbing caster wheel suspensions remain operative to absorb shock and reduce transmission of relatively high impact forces from the wheel of the suspension to the equipment supported by the suspension, and to also dampen vertical oscillation to overcome resonant vibration problems.

The embodiments of the invention in which an exclusive property or privilege is claimed are defined as follows:

1. A system for anchoring a mobile equipment carrier on a platform for transport by a freight carrier wherein the mobile equipment carrier is supported on a plurality of shock absorbing casters, each shock absorbing caster including a caster bracket mounted on the mobile equipment carrier for swiveling movement relative thereto about a generally upright caster axis, a wheel support bracket mounted on the caster bracket for swinging movement relative thereto about a generally horizontal pivot axis, a caster wheel mounted on the wheel support bracket for rotation about a generally horizontal wheel axis parallel to the pivot axis, the caster wheel having an outer periphery and opposite sides, and vibration dampening means acting between the wheel support bracket and the caster bracket for dampening vertical oscillation of the wheel support bracket relative to the caster bracket, and wheel anchor means including a base bracket and a hold-down bracket for attaching each caster wheel to the platform to retain the caster wheel against rolling and swiveling about the caster axis while accommodating relative vertical swinging movement between the wheel support bracket and caster bracket about the horizontal pivot axis, the base bracket having end portions and a wheel receiving portion intermediate the end portions adapted to underlie a caster wheel below the wheel axis, the wheel receiving portion defining at least a first wheel chock means for engaging a lower portion of the periphery of the caster wheel at a location at a first side of a vertical plane through the wheel axis to inhibit rolling of the caster wheel in one direction, the hold-down bracket having a mounting portion at one end adapted for attachment to one end portion of the base bracket and a wheel engaging portion rigid with the mounting portion, the wheel engaging portion extending upwardly from the mounting portion at a second side of the vertical plane through the caster wheel axis opposite said first side and along an upper portion of the caster wheel periphery opposite the portion of the caster wheel periphery engaged by said first wheel chock means to a location above the caster wheel axis to hold the caster wheel down on the wheel receiving portion of the base bracket, and fastener means for detachably securing the mounting portion of the hold-down bracket to one end portion of the base bracket and to the platform, at least one of the items comprising the base bracket and hold-down bracket having abutment means engageable with the opposite sides of the caster wheel adjacent the outer periphery thereof for inhibiting lateral movement of the caster wheel and swiveling of the caster wheel about the caster axis.

2. A system for anchoring a mobile equipment carrier on a platform according to claim 1 wherein said intermediate portion of the base bracket is shaped to provide an upwardly opening wheel receiving saddle defining said first wheel chock means and a second wheel chock means for engaging a lower portion of the periphery of the caster wheel at said second side of the vertical plane through the axis, said abutment means including laterally spaced ribs along at least a portion of said saddle adapted to engage the opposite sides of the caster wheel adjacent the outer periphery thereof.

3. A system for anchoring a mobile equipment carrier on a platform according to claim 2 wherein said hold-down bracket has downwardly extending ears on said wheel engaging portion adapted to engage opposite sides of the caster wheel adjacent the outer periphery thereof.

4. A system for anchoring a mobile equipment carrier on a platform according to claim 1 wherein the base bracket is formed of sheet metal, the wheel receiving portion being shaped to provide an upwardly opening saddle, said end portions extending generally tangent to a plane through the underside of said saddle, the first wheel chock means extending above that plane, said wheel receiving portion having laterally spaced ribs adapted to engage the opposite sides of the caster wheel adjacent the outer periphery thereof.

5. A system for anchoring a mobile equipment carrier on a platform according to claim 4 wherein said hold-down bracket is formed of sheet metal, the mounting portion having laterally extending flanges along opposite side edges and the wheel engaging portion having laterally extending flanges along opposite side edges merging with the flanges on the mounting portion, and depending ears on the upper end of the wheel engaging portion adapted to engage opposite sides of the caster wheel adjacent its outer periphery.

6. A system for anchoring a mobile equipment carrier on a platform for transport by a freight carrier wherein the mobile equipment carrier is supported on a plurality of shock absorbing casters, each shock absorbing caster including a caster bracket mounted on the carrier for swiveling movement relative thereto about a generally upright caster axis, a wheel support bracket mounted on the caster bracket for vertical swinging movement relative thereto about a generally horizontal pivot axis, a caster wheel mounted on the wheel support bracket for rotation about a generally horizontal wheel axis parallel to the pivot axis, the caster wheel having an outer periphery and opposite sides and vibration dampening means acting between the wheel support bracket and the caster bracket for dampening vertical oscillation of the wheel support bracket relative to the caster bracket, and wheel anchor means individual to each caster and each including a base bracket and a hold-down bracket for attaching a respective one of the caster wheels to the platform to retain the caster wheel against rolling and swiveling about the caster axis while accommodating relative vertical swinging movement between the wheel support bracket and caster bracket about the horizontal pivot axis, the base bracket comprising a one-piece sheet metal member having end portions and an upwardly facing saddle shaped intermediate portion integral with the end portions and adapted to receive a caster wheel, the hold-down bracket comprising a one-piece sheet metal member having a mounting portion adapted for attachment to one end of the base bracket and a wheel engaging portion rigid with the mounting portion, the wheel engaging portion extending upwardly from the mounting portion and curved to extend around an upper portion of the outer periphery of a caster wheel to retain the wheel in the saddle shaped intermediate portion of the base bracket, the base bracket having laterally spaced ribs in the saddle shaped intermediate portion adapted to engage opposite sides of the caster wheel adjacent the outer periphery thereof, and fastener means for securing the mounting portion of the hold-down bracket to one end portion of the base bracket and to the platform.

7. A system for anchoring a mobile equipment carrier on a platform according to claim 6 wherein the wheel engaging portion of the hold-down bracket extends to a location above the wheel axis and has depending ears adapted to engage opposite sides of a caster wheel adjacent the outer periphery thereof.

8. A system for anchoring a mobile equipment carrier on a platform according to claim 7 wherein the mounting portion and wheel engaging portions of the hold-down bracket have laterally extending stiffening flanges along opposite side edges.

* * * * *